Aug. 8, 1939. F. H. GULLIKSEN 2,169,026
CUTTER REGISTER CONTROL
Filed March 19, 1938
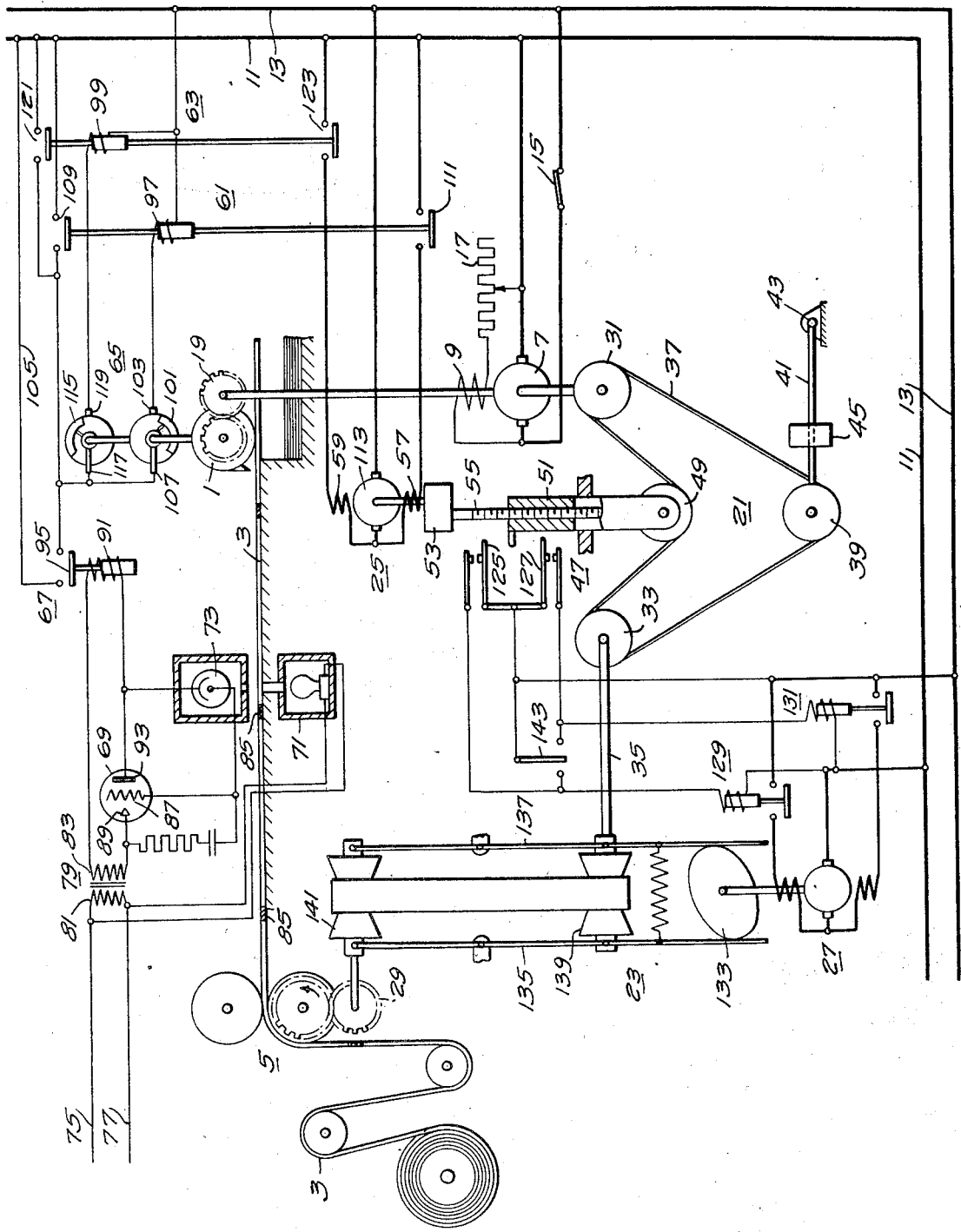
WITNESSES:
E. A. McCloskey.
Leon J. Taza.
INVENTOR
Finn H. Gulliksen.
BY
Paul E. Friedemann
ATTORNEY Patented Aug. 8, 1939

2,169,026

UNITED STATES PATENT OFFICE 2,169,026

CUTTER REGISTER CONTROL

Finn H. Gulliksen, Wilkinsburg, Pa., assignor to Westinghouse Electric & Manufacturing Company, East Pittsburgh, Pa., a corporation of Pennsylvania Application March 19, 1938, Serial No. 197,042

14 Claims. (Cl. 164—68)

The invention relates to control systems for apparatus operating on a material and it has particular relation to an electrically controlled mechanism for synchronizing certain parts of a machine operating on a web of material.

In the art of paper cutting, winding, printing, or other mnufacturing processes, such as the making of bags, the operation on the paper or web of material, when moving from a supply reel over certain feed rolls to the cutter, or to other parts of the machine, nearly always involves slippage, whereby the paper becomes shifted relative to the cutter or other machine element. Even when there be no slippage, the hygroscopic characteristics of paper, or temperature, or both, will cause a change in its dimensions, and also its surface characteristics, with changes of relative humidity, and/or changes in temperature, with the result that certain machine elements will not register with the paper in the desired manner. Slippage and the moisture effect of course may occur simultaneously.

The slippage of the material and the effect of temperature changes to which reference has been made with regard to paper may also occur in the manufacture of rubber, the drawing of wire, the rolling of steel sheets, and other industrial applications.

It is accordingly an object of my invention to provide for properly registering certain regions of a material being operated upon by a machine with certain elements of the machine.

It is another object of this invention to control the operation of apparatus operating on a web so that the required operation on the web will take place at the right point, regardless of slippage of the web, or changes of dimensions thereof.

A further object of my invention is to provide apparatus for controlling the relative positions of a cutter and the feeding means of a machine operating on a web.

A still further object of my invention is to provide apparatus for controlling the relative speeds of a cutter and the feeding means of a machine operating on a web.

Another object of my invention is to provide apparatus for controlling the relative positions of certain parts of a machine operating on a web and the relative speeds of these parts.

According to my invention, a web feeding device and a cutter or any other device for operating upon a web material are connected to a common drive. Between one of these devices and the common drive, I provide position adjusting means for adjusting the relative position of certain parts of the cutter and the web feeding device. The position adjusting means comprises a plurality of wheels, such as sprockets or pulleys, connected together by a band, such as a chain or a belt. One wheel is disposed to be driven by the driving means. Another wheel is disposed to be connected, as desired, either directly or through suitable speed changing means to drive one of the devices associated with or operating on the web. The band passes around the wheels so as to transmit motion, and thus there are two portions of the band, a driving or tight side and a following or slack side, between these wheels. An idler-wheel, or several idler-wheels, or any other tension-adjusting device, preferably associated with the slack side of the band, is utilized to maintain the band at a predetermined tension. A band-adjusting device is disposed to be cooperatively associated with the band, preferably the tight side, so that when it is actuated the relative positions of certain parts of the cutter and the web feeding device are altered in a predetermined manner.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, the sole figure of which is a diagrammatic representation of an embodiment of the invention.

The apparatus shown in the drawing comprises a cutter 1 which operates to cut a web 3. A feeding device 5 is provided to feed the web to the cutter 1. A main motor, shown as a direct current motor 7 having a field winding 9, is supplied with electrical energy from buses 11 and 13 through a circuit closing device 15. While the main motor 7 is preferably operated at a constant speed, the motor speed may be adjusted at will by means of a rheostat 17. The motor 7 is coupled to the cutter 1 through a reduction gear 19.

The main motor 7 is also utilized to drive the feeding device 5. The operation of the feeding device takes place through position adjusting means, such as an adjustable belt drive or localizer 21, and a speed changer 23, both of which may be independently adjusted by motors 25 and 27, respectively. The feeding device 5 is coupled to the speed changer 23 through a reduction gear 29.

The localizer 21 is utilized to adjust certain parts of the cutter 1 relative to certain parts of the feeding device 5 or to certain parts of the web 3 which is driven by the feeding device. The speed changer 23 is provided to adjust the relative speeds of the web-feeding device 5 and the cutter 1.

Mounted on the shaft of the main motor is a pulley 31 of the localizer 21. Another pulley 33 is connected to the speed changer 23 by means of a shaft 35. The pulleys 31 and 33 are connected by a belt 37. When desirable a chain or any other suitable band may be utilized to connect the pulleys. The belt also passes over an idler pulley 39 which is supported by a member 41 pivoted at 43. A weight 45 or any other suitable band tensioning means associated with the member 41 is utilized to maintain a predetermined tension in the chain, band or belt 37.

It will readily be understood that sprocket wheels are utilized instead of the pulleys herein described when a chain is used for element 37.

A belt-adjusting device 47 is also disposed to be cooperatively associated with the belt 37. The belt-adjusting device comprises a pulley 49 supported by a slidably mounted frame 51. The frame 51 and thus the pulley 49 are operated in an upward or downward direction by means of the small motor 25 connected to the frame 51, by means of suitable reduction gearing 53 and a screw 55. The motor 25 is provided with oppositely wound series windings 57 and 59 for the purpose of effecting rotation in respectively opposite directions when one or the other of these series windings 57 and 59 is energized by means of electromagnetic devices 61 and 63, respectively. To actuate the electromagnetic devices 61 and 63, a drum controller 65 is mounted on the shaft of the cutter 1 and it cooperates with an electromagnetic device 67 controlled by thermionic means 69 which, in turn, is controlled by the cooperative action of a light source 71 and light sensitive means 73.

A better understanding of this invention may be had from a study of a complete cycle of operation for the cutter and feeding means and the control means therefor. Assume that the conductors 11 and 13, and also a pair of conductors 75 and 77, are suitably energized from sources of supply, not shown, and that the circuit closing device 15 is in the closed position as shown in the drawing. The main motor 7 and its field winding 9 are thus connected across the conductors 11 and 13. A transformer 19 having a primary winding 81 and a secondary winding 83 is connected across the energized conductors 75 and 77.

The material 3 is provided with indicia 85 which intermittently intercepts the light from the source of light 71 to the light-responsive means 73. Every time the indicia 85 pass between the source of light 71 and the light-sensitive means 73, the thermionic means 69 has the bias of its grid 87 changed with reference to the cathode 89 so that a current will flow through the operating coil 91 of the electromagnetic device 67. The circuit for this coil extends from one end of the secondary winding 83, through coil 91, anode 93, cathode 89 to the other end of the secondary winding 83. The electromagnetic device 67 is thus actuated to close a set of contacts 95.

If the cutter operates properly with reference to the indicia 85, no change of the relative positions of certain parts of the cutter 1 and the feeding device 5 is needed. In consequence, neither of the electromagnetic devices 61 nor 63 will be caused to operate because the drum controller 65 will be in such a position as not to complete a circuit for either of the operating coils 97 and 99 of these electromagnetic devices.

If for any reason the cutter 1 is not properly positioned with reference to the web 3, that is, it is not doing the cutting operation at the proper and designated section line of the web 3, then the control means hereinabove referred to functions to start the motor 25 and thus the frame 51 of the belt adjusting device 47 either in one or the other direction, depending upon whether the feeding device 5 is operating too slowly or too rapidly with reference to the cutter 1.

When the feeding device 5 is operating too fast with reference to the cutter 1, a segment 101 of the drum controller 65 will make contact with a brush 103, thereby establishing a circuit from energized conductor 11 through the conductor 105, contacts 95, brush 107, segment 101, brush 103, operating coil 97 of electromagnetic device 61 to the other energized conductor 13, whereby the contacts 109 and 111 will be closed. The closing of contacts 109 establishes a holding circuit for coil 97 which extends from the conductor 11 through contacts 109 to the brush 107. Electromagnetic device 61 will remain in the actuated position independently of the operation of the photo-sensitive device 69 until the segment 101 passes from under the brush 103. The operation of the photo-sensitive device 69 initiates the closing of electromagnetic device 61 but does not influence the length of time that it remains in the energized condition.

The closing of contacts 111 establishes a circuit that extends from energized conductor 11 through contacts 111, field winding 57, armature 113 to the other energized conductor 13, thus energizing the motor 25. The motor 25 drives the screw 55 so as to cause the frame 51 and thus the pulley 49 to move upwardly. The belt 37 remains in contact with the pulley 49 because of the weight 45 acting on the belt through the pulley 39. The movement of the pulleys 49 and 39 tends to cause the belt to move over the pulley 33 in the direction opposite to that in which it is being driven by the pulley 31. The result is that the pulley 33 momentarily rotates at a slower speed than the speed of pulley 31. The position of certain parts of the feeding device 5 and the web 3 are thus retarded relative to the cutter 1. This momentary change in speed will continue intermittently, the time being determined by the length of the segment 101, until the indicia 85 are again in proper relation to the cutter 1.

When the cutter operates too slowly with reference to the feeding device 5, segment 115 will take a position to complete a circuit when the contacts 95 are closed, which circuit extends from the energized conductor 11 through the conductor 105, contacts 95, brush 117, segment 115, brush 119, operating coil 99 of the electromagnetic device 63 to the energized conductor 13, whereby the contacts 121 and 123 will be closed. The closing of contacts 121 establishes a holding circuit for coil 99 which extends from the conductor 11 through contacts 121 to the brush 117.

The closing of contacts 123 establishes a circuit that extends from the energized conductor 11 through contacts 123, field winding 59, armature 113 to the energized conductor 13, thus energizing the motor 25. The motor 25 drives the screw 55 so as to cause the frame 51 and thus the pulley 49 to move downwardly. The movement of the pulleys 49 and 39 causes the belt 37 to move so that the pulley 33 momentarily rotates at a speed relatively faster than that of pulley 31 and thus the position of certain parts of the feeding device 5 and the web 3 are advanced relative to certain parts of the cutter 1. This momentary increase in the speed of pulley 33 is continued intermittently until the cutter 1 is again in proper relation to the indicia 85 on the web 3.

If the slippage or the moisture effect causes the error in the registry to be cumulative, the motor 25 continues to drive the screw 55 in the same direction of rotation until the frame 51 actuates a contact making device 125 when the frame 51 moves a predetermined distance in the upward direction or a contact making device 127 when the frame 51 moves a predetermined distance in the downward direction. It will be apparent that the contact making devices 125 and 127 may actuate any of the well known signalling devices or they may be utilized to actuate means for deenergizing either or both of the motors 7 and 25 until the necessary adjustments are made by the operator.

However, it is preferred that the contact making devices 125 and 127 be utilized as means for actuating a pair of electromagnetic devices 129 and 131, respectively, thus energizing the motor 27 so as to drive a cam 133 in a predetermined direction of rotation. Any movement of the cam will operate the spring biased levers 135 and 137 in such a direction that the cone-shaped two-part pulleys 139 and 141 will introduce a permanent change of the speed of the feeding device 5 relative to the speed of the cutter 1. The arrangement is such that cam 133 remains in its adjusted position.

A circuit closing device 143 is provided for manually energizing the electromagnetic devices 129 and 131 and thus manually adjusting the speed controller 23.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. In a system of control for apparatus operating on material, in combination, a device for effecting certain operations on the material, feeding means for feeding the material to the said device, common means for driving the said feeding means and the said device, speed control means for changing the speed relation between the said device and said feeding means, position adjusting means for changing the relative position of certain parts of the said device and the said feeding means, the said position adjusting means comprising a wheel mechanically connected to said device, a wheel mechanically connected to the said feeding means, an endless band for mechanically operatively interconnecting the said wheels, and means associated with the said endless band for changing the relative lengths of the two portions of said band interconnecting said wheels, adapted to adjust the positional relation of the said wheels to thus change the relative position of the said certain parts of the said device and the said feeding means.

2. In a system of control for apparatus operating on material, in combination, a device for effecting certain operations on the material, feeding means for feeding the material to the said device, common means for driving the said device and said feeding means, speed control means for changing the speed relation between the said device and the said feeding means, position adjusting means for changing the relative position of certain parts of the said device and the said feeding means, the said position adjusting means comprising, a wheel mechanically connected to the said device, a second wheel mechanically connected to the said feeding means, an endless band for mechanically operatively interconnecting the said wheels, and motor-operated adjusting means associated with said band for changing the relative lengths of the two portions of said band interconnecting said wheels, adapted to adjust the positional relation of the said wheels to thus change the relative position of the said certain parts of the said device and the said feeding means, and means associated with the said material for controlling the said motor-operated adjusting means.

3. In a system of control for apparatus operating on material, in combination, a device for effecting certain operations on the material, a feeding means for feeding the material to the said device, common means for driving the said device and said feeding means, speed control means for changing the speed relation between the said device and the said feeding means, position adjusting means for changing the relative position of certain parts of the said device and the said feeding means, the said position adjusting means comprising, a wheel mechanically connected to the said device, a wheel mechanically connected to the said feeding means, an endless band for mechanically operatively connecting the said wheels, and motor-operated adjusting means associated with the said band for changing the relative length of the two portions of the said band interconnecting said wheels, adapted to adjust the positional relation of the said wheels to thus change the relative position of the said certain parts of the said device and the said feeding means, means associated with the said material for controlling the said motor-operated adjusting means, and means associated with the said adjusting means for controlling the said speed control means.

4. In a control system for apparatus operating on a web having indicia thereon, in combination, a web cutter, a motor for driving the cutter, a web feeding mechanism driven by the said motor, a localizer for changing the relative position of the cutter and certain elements of the web feeding mechanism, the said localizer comprising a first wheel mechanically connected to the said cutter, a second wheel mechanically connected to the said feeding mechanism, a flexible endless band passing round the said first and second wheels for communicating motion from one wheel to the other, adjusting means operatively associated with the said band for changing the relative lengths of the two portions of said band passing between the wheels, illuminating means for the said web, light-sensitive means operatively associated with the said web and the said illuminating means for controlling the operation of the said adjusting means when the indicia on the web has changed a predetermined amount with reference to said cutter when the cutter is in a given position.

5. In a control system for apparatus operating on a web having indicia thereon, in combination, a web cutter, a motor for driving the cutter, a web feeding mechanism driven by the said motor, a localizer for changing the relative position of the cutter and certain elements of the web feeding mechanism, the said localizer having a belt operatively interconnecting the said cutter and the said web feeding mechanism and adjusting means operatively associated with the said belt for changing the relative lengths of the two portions of said belt disposed between the said cutter and feeding mechanism, illuminating means for the said web, light-sensitive means operatively associated with the said web and the said illuminating means for controlling the operation of the said adjusting means when the indicia on the web has changed a predetermined amount with reference to said cutter when the cutter is in a given position.

6. In a control system for apparatus operating on a web having indicia thereon, in combination, a web cutter, a motor for driving the cutter, a web feeding mechanism driven by the said motor, a localizer for changing the relative position of the cutter and certain elements of the web feeding mechanism, the said localizer comprising a first sprocket, mechanically connected to the said cutter, a second sprocket mechanically connected to the said feeding mehanism, a chain passing around said first and second sprockets for communicating motion from one sprocket to the other, adjusting means operatively associated with the said chain for changing the relative lengths of the two portions of said chain disposed between the sprockets, illuminating means for the said web, light-sensitive means operatively associated with the said web and the said illuminating means for controlling the operation of the said adjusting means when the indicia on the web has changed a predetermined amount with reference to said cutter when the cutter is in a given position.

7. In a control system for apparatus operating on a web having indicia thereon, in combination, a web cutter, a motor for driving the cutter, a web feeding mechanism driven by the said motor, a speed changer for changing the relative speed of the cutter and the web feeding mechanism, a localizer for changing the relative position of the cutter and certain elements of the web feeding mechanism, the said localizer comprising a first sprocket mechanically connected to the said cutter, a second sprocket mechanically connected to the said feeding mechanism, a chain passing around said first and second sprockets for communicating motion from one sprocket to the other, adjusting means operatively associated with the said chain for changing the relative lengths of the two portions of said chain disposed between said sprockets, illuminating means for the said web, light-sensitive means operatively associated with the said web and the said illuminating means for controlling the operation of the said speed changer and the said adjusting means when the indicia on the web has changed a predetermined amount with reference to said cutter when the cutter is in a given position.

8. In a control system for apparatus operating on a web having indicia thereon, in combination, a web cutter, a motor for driving the cutter, a web feeding mechanism driven by the said motor, a speed changer for changing the relative speed of the cutter and the web feeding mechanism, a localizer for changing the relative position of the cutter and certain elements of the web feeding mechanism, the said localizer comprising a first sprocket mechanically connected to the cutter, a second sprocket mechanically connected to the said feeding mechanism, a chain passing around said first and second sprockets for communicating motion from one sprocket to the other, adjusting means operatively associated with the said chain for changing the relative lengths of the two portions of said chain disposed between said sprockets, illuminating means for the said web, light-sensitive means operatively associated with the said web and the said illuminating means for controlling the operation of the said adjusting means when the indicia on the web has changed a predetermined amount with reference to the said cutter and means operatively associated with the said adjusting means for controlling the operation of the said speed changer.

9. In a system of control for apparatus operating on material, in combination, a first device for effecting certain operations on the material, a second device for feeding the material to the said first device, common means for driving the said first device and the said second device, a speed changer for changing the relative speed of the said first device and the said second device, a chain drive having a chain operatively interconnecting said first and second devices and chain adjusting means for changing the relative lengths of the two portions of said chain disposed between said devices for changing the relative position of certain elements of the said first device and the said second device and means actuated by the said chain adjusting means for controlling the said speed changer.

10. In a system of control for two machines the operating speeds of which relative to each other are to be varied, in combination, a localizer for said machines adapted to vary the relative speed of the said machines, said localizer comprising a wheel on one machine, a wheel on the other machine, an endless strand of material, such as a belt or chain, longer than twice the distance between the two wheels operatively interconnecting the two wheels, and means for changing the relative length of the two portions of the strand operatively interconnecting the two wheels.

11. In a system of control for two machines the operating speeds of which relative to each other are to be varied, in combination, a localizer for said machines adapted to vary the relative speed of the said machines, said localizer comprising a wheel on one machine, a wheel on the other machine, an endless strand of material, such as a belt or chain, longer than twice the distance between the two wheels operatively interconnecting the two wheels, and two deflecting members operating substantially in unison for changing the relative length of the two portions of the strand operatively interconnecting the two wheels.

12. In a system of control for two machines the operating speeds of which relative to each other are to be varied, in combination, a wheel on one machine, a wheel on the other machine, an endless strand of material, such as a belt or chain, longer than twice the distance between the two wheels operatively interconnecting the two wheels, adjusting means for changing the relative length of the two portions of the strand operatively interconnecting the two wheels, and photoelectric means for controlling the said adjusting means.

13. In a system of control for two machines operating at substantially the same relative speeds, a localizer mechanically interconnecting the two machines, the said localizer comprising a sprocket mechanically connected to one of the machines, a second sprocket mechanically connected to the other of said machines, an endless chain for transmitting motion passing round said sprockets, said chain thus having two portions passing between the said sprockets, and chain adjusting means for changing the relative length of the two portions of the said chain to thus change the relative positions of the said first and the said second sprockets.

14. In a system of control for two machines operating at substantially the same relative speeds, a chain drive mechanically interconnecting the two machines, the said chain drive comprising a sprocket mechanically connected to one of the machines, a second sprocket mechanically connected to the other of said machines, an endless chain for transmitting motion passing round said sprockets, said chain thus having two portions passing between the said sprockets, chain adjusting means for changing the relative length of the two portions of the said chain to thus change the relative positions of the said first and the said second sprockets, and photo-electric means cooperatively associated with two machines for controlling the said chain adjusting means.

FINN H. GULLIKSEN.